(12) United States Patent
Kodama et al.

(10) Patent No.: US 6,991,337 B2
(45) Date of Patent: Jan. 31, 2006

(54) IMAGE DISPLAY APPARATUS

(75) Inventors: Hiroyuki Kodama, Tochigi (JP);
Atsushi Okuyama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 10/647,630

(22) Filed: Aug. 25, 2003

(65) Prior Publication Data

US 2004/0061837 A1 Apr. 1, 2004

Related U.S. Application Data

(63) Continuation of application No. 10/126,270, filed on Apr. 18, 2002, now Pat. No. 6,637,889.

(30) Foreign Application Priority Data

Apr. 26, 2001 (JP) ......................................... 2001-129618

(51) Int. Cl.
*G03B 21/14* (2006.01)

(52) U.S. Cl. ............................. 353/98; 353/119; 353/37
(58) Field of Classification Search .................. 353/31, 353/33, 34, 37, 119, 89, 99; 349/5, 7, 9
See application file for complete search history.

(56) References Cited

U.S. PATENT DOCUMENTS

| | | | | |
|---|---|---|---|---|
| 5,738,426 A | * | 4/1998 | Daijogo et al. | 353/31 |
| 6,000,802 A | * | 12/1999 | Hashizume et al. | 353/38 |
| 6,637,889 B2 | * | 10/2003 | Kodama et al. | 353/31 |

* cited by examiner

*Primary Examiner*—William C. Dowling
(74) *Attorney, Agent, or Firm*—Morgan & Finnegan, LLP

(57) ABSTRACT

An image display apparatus discloed includes a condensing optical system changing illumination light from a light source converging light; separation optical system having separation optical member reflecting color light component in specific wavelength range of the converging light and transmitting color light components the other wavelength ranges; a plurality of image display devices illuminated by a plurality of color flight components separated by the color separation optical system, respectively, color combination optical system image light components from the plurality of image plurality combining colors emanating and display devices; projection optical system for projecting image light components combined by the color combination optical system on surface on which projection is performed, light incident color separation optical member forms an angle smaller than 45 degrees with a normal to light incident surface of the color separation optical member.

10 Claims, 6 Drawing Sheets

(a) DM1

(b) DM2

(c) TR (a) DM101

(b) DM102

(c) TR0

IMAGE DISPLAY APPARATUS

This application is a continuation of 10/126,270, filed Apr. 18, 2002 and now U.S. Pat. No. 6,637,889.

BACKGROUND OF THE INVENTION

1. Field of the Invention

The present invention relates to projection type image display apparatus for color separating illumination light to illuminate a plurality of image display devices with the separated light components and combining image light components emanating from these image display devices for projective display.

2. Description of the Related Art

In recent years, a projection type image display apparatus with an improved brightness and a compact size is needed.

FIG. 4 shows the configuration of a conventional projection type image display apparatus. In FIG. 4, white illumination light emitted from an illumination light source 101 is reflected by a reflector 102, passes through a fly eye lens 103, further reflected by a mirror M101, passes through a fly eye lens 104, a light polarization converting device 105 and a condenser lens 106, and then incident on a dichroic mirror DM101.

In general, as the illumination light source, a halogen lamp, a metal halide lamp, an ultra-high pressure mercury lamp or the like is used.

The dichroic mirror DM101 has a spectral transmittance shown in FIG. 5(a), in which a light component in a wavelength range for blue is reflected and a light component in a wavelength range for green to red is transmitted. The light component in the wavelength range for green to red passing through the dichroic mirror DM101 is incident on a dichroic mirror DM102. The dichroic mirror DM102 has a spectral transmittance shown in FIG. 5(b), in which a light component in a wavelength range for green is reflected and a light component in a wavelength range for red is transmitted.

The light component in the wavelength range for blue reflected by the dichroic mirror DM101 is turned 90 degrees by a reflecting mirror M102, passes through a field lens 107B, and incident on an image display device 108B, where the light is modulated in accordance with a signal input to the image display device 108B.

The light component in the wavelength range for green reflected by the dichroic mirror DM102 passes through a field lens 107G and is incident on an image display device 108G, where the light is modulated in accordance with a signal input to the image display device 108G.

The light component in the wavelength range for red transmitted through the dichroic mirror DM102 passes through a trimming filter TR0 having a spectral transmittance shown in FIG. 5(c), a condenser lens 111, a relay lens 112, reflecting mirrors M103, M104 and a field lens 107R, and then is incident on an image display device 108R, where the light is modulated.

The image light component for each color, modulated by the respective image display device 108R, 108B and 108G as described above, is incident on a cross dichroic prism 109. The light components in the wavelength ranges for blue and red are turned 90 degrees within the cross dichroic prism 109, while the light component in the wavelength range for green is transmitted as it is through the cross dichroic prism 109. Then, the light components of all the wavelength ranges emanate in combination.

The image light resulting from the color combination in the cross dichroic prism 109 is projected and displayed on a screen, not shown, by a projection lens 110.

In the conventional projection type image display apparatus configured in this manner, the dichroic mirror DM102 is disposed immediately before the image display device 108G and is responsible for separating the optical path of the light component in the wavelength range for green from the optical path of the light component in the wavelength range for red and for bending the optical path of the light component in the wavelength range for green. The dichroic mirror DM102 is arranged such that the optical axis of the light incident on the dichroic mirror DM102 forms an angle of 45 degrees with the normal to the incident surface of the dichroic mirror DM102.

In the aforementioned configuration of the apparatus, however, the optical axis of the illumination light from the illumination light source 101 to the reflecting mirror M101 is arranged in parallel with the optical axis of the projection lens 110, and the condensing effect of the condenser lens 106 converges the luminous flux toward the image display device 108R, 108G and 108B. Thus, when the apparatus is housed in an outer box 120, the probability is that spaces S1, S2 with little usefulness are created as shown by hatched portions in FIG. 6 to increase the apparatus in size.

In addition, while the aforementioned image display apparatus employs the relay lens 112, the reflecting mirrors M103, M104 and the like to form the relay system for red light, it is contemplated that a relay system formed of combined concave mirrors is used instead of the above relay system. The concave mirrors, however, are likely to suffer from aberration if light is incident thereon at a large angle, thereby possibly causing loss of light quantity or failing to achieve favorable display images.

SUMMARY OF THE INVETION

It is an object of the present invention to propose a projection type image display apparatus which has a higher degree of freedom in arranging a color separation optical system with respect to an image light combination/projection optical system to allow the whole apparatus to be compact in size.

To achieve the aforementioned object, the present invention provides an image display apparatus comprising:

a condensing optical system for changing illumination light from a light source to converging light;

a color separation optical system having a color separation optical member for reflecting a color light component in a specific wavelength range of the converging light and transmitting color light components in the other wavelength ranges;

a plurality of image display device illuminated by a plurality of color light components separated by the color separation optical system, respectively, a color combination optical system for combining image light components of a plurality of colors emanating from the plurality of image display devices; and a projection optical system for projecting image light components combined by said color combination optical system on a surface on which projection is performed, wherein the optical axis of light incident on the color separation optical member forms an angle smaller than 45 degrees with the normal to a light incident surface of the color separation optical member.

The aforementioned invention further has a relay optical system disposed in an optical path with a length larger than the lengths of the other optical paths of a plurality of optical paths of color light components from the light source to the plurality of image display device, wherein the relay optical system includes a reflecting member having a concave-shaped reflecting surface. An angle which an optical axis of light incident on the reflecting member forms with the normal to the reflecting surface passing through the intersection of the optical axis and the reflecting surface of the reflecting member is smaller than 45 degrees.

In addition, in the present invention, an angle which an optical axis of light incident on the reflecting member forms with the normal to the reflecting surface passing through the intersection of the optical axis and the reflecting surface of the reflecting member is smaller than an angle which an optical axis of light incident on the color separation optical member forms with the normal to the light incident surface of the color separation optical member.

To achieve the aforementioned object, the present invention provides an image display apparatus comprising:

a condensing optical system for changing illumination light from a light source to converging light;

a color separation optical system having a color separation optical member for reflecting a color light component in a specific wavelength range of the converging light and transmitting color light components in the other wavelength ranges;

a plurality of image display device illuminated by a plurality of color light components separated by the color separation optical system, respectively;

a color combination optical system for combining image light components of a plurality of colors emanating from the plurality of image display devices;

a projection optical system for projecting image light components combined by the color combination optical system on a surface on which projection is performed; and an outer box for housing the condensing optical system, the color separation optical system, the plurality of image display device, the color combination optical system and the projection optical system, wherein a wall surface closest to the condensing optical system and the color separation optical member of wall surfaces substantially perpendicular to the optical axis direction of the projection optical system in the outer box extends along a portion, which is farthest from the projection optical system, of the outer periphery of converging light incident on the color separation optical member from the condensing optical system.

The phrase "extends along" means that the wall surface is substantially in parallel with and close tothe portion.

Furthermore, to achieve the aforementioned object, the present invention provides an image display apparatus comprising:

a condensing optical system for changing illumination light from a light source to converging light;

a color separation optical system having a color separation optical member for reflecting a color light component in a specific wavelength range of the converging light and transmitting color light components in the other wavelength ranges;

a plurality of image display device illuminated by a plurality of color light components separated by the color separation optical system, respectively;

a color combination optical system for combining image light components of a plurality of colors emanating from the plurality of image display devices; and a projection optical system for projecting image light components combined by the color combination optical system on a surface on which projection is performed, wherein a direction of a portion, which is farthest from the projection optical system, of the outer periphery of converging light incident on the color separation optical member from the condensing optical system is substantially perpendicular to the optical axis direction of the projection optical system.

DESCRIPTION OF THE PREFERRED EMBODIMENTS

Figure 1:
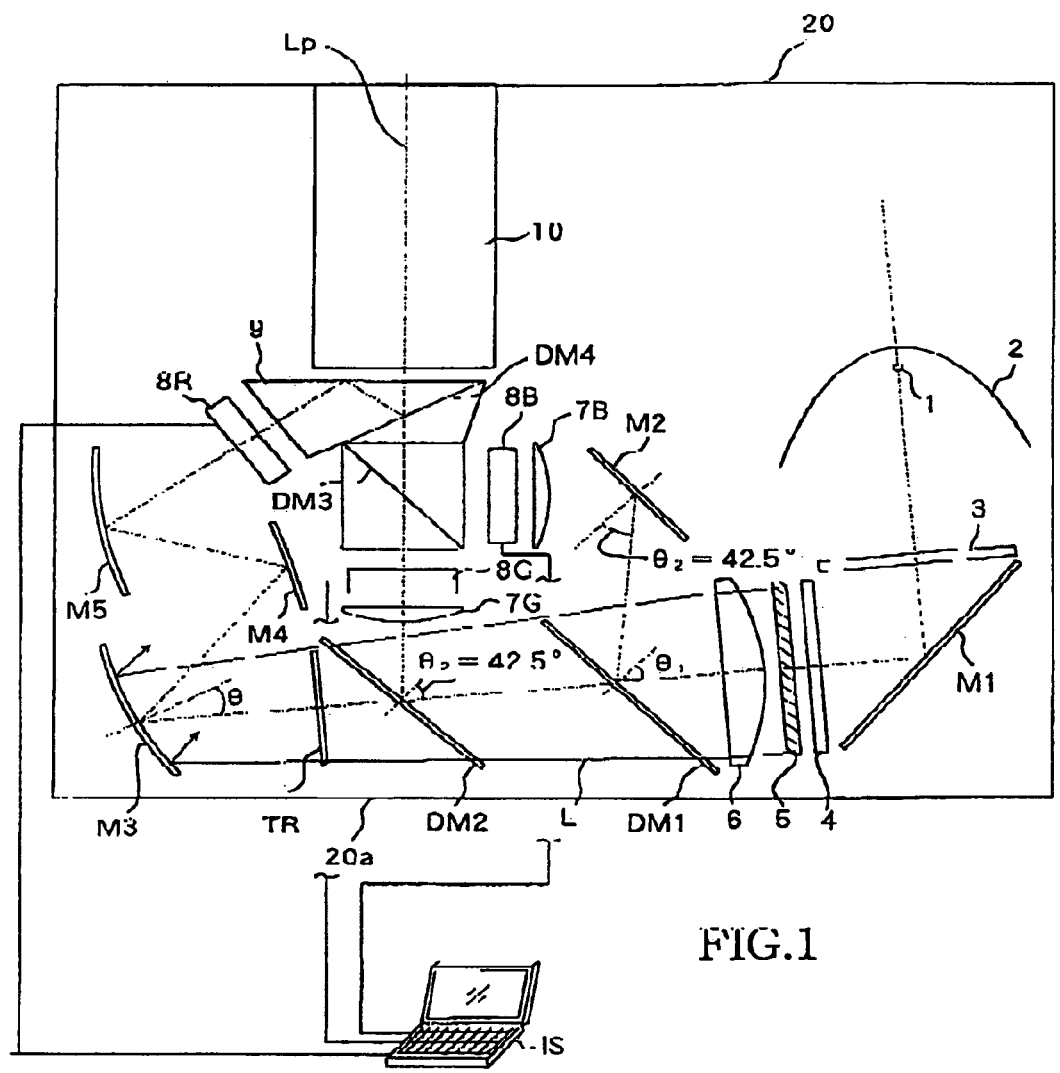
FIG. 1 is a sectional view showing the configuration of a projection type image display apparatus which is an embodiment of the present invention.
Figure 2:
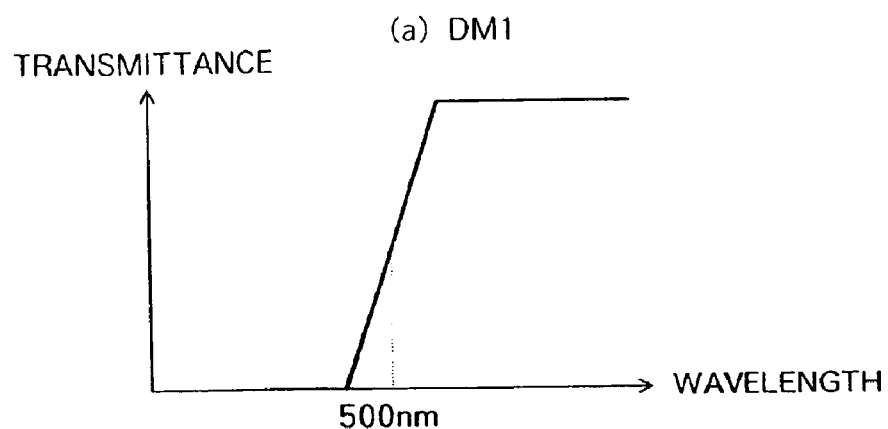
FIGS. 2(a) to 2(c) are schematic graphs illustrating the spectral characteristics of dichroic mirrors and a trimming filter used in the aforementioned image display apparatus.
Figure 2:
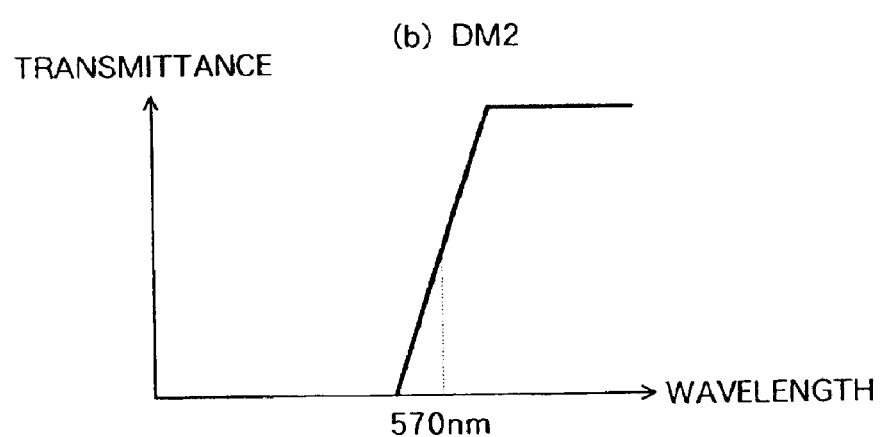
Figure 2:
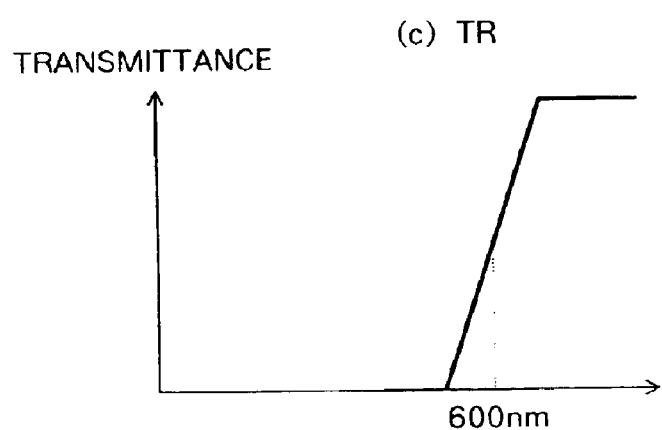

FIG. 1 shows the configuration of a projection type image display apparatus which is an embodiment of the present invention. FIG. 2 illustrates spectral transmittances of dichroic mirrors DM1, DM2 and a trimming filter TR. These spectral transmittances are exemplary values in design when an ultra-high pressure mercury lamp is used as an illumination light source. However, the numerical values are only illustrative, and the spectral transmittances are not limited to those values. In other words, various values can be set in accordance with the type of the illumination light source.

In FIG. 1, part of white light emitted from an illumination light source 1 is incident on a fly eye lens 3 as it is, while the remainder of the light is reflected by a reflector 2 and then incident on the fly eye lens 3.

The illumination light passing through the fly eye lens 3 is turned approximately 90 degrees by a mirror M1 serving as an illumination reflecting member, passes through a fly eye lens 4, a light polarization converting device 5 and a condenser lens 6 serving as a condensing optical device, and then incident on a dichroic mirror DM1.

The illumination light is subjected to a converging (condensing) effect as it passes through the condenser lens 6, and thus converging in the direction in which the illumination light travels.

The dichroic mirror DM1 has a spectral transmittance shown in FIG. 2(a), in which a light component in a wavelength range for blue is reflected and a light component in a wavelength range for green to red is transmitted.

The light component in the wavelength range for green to red transmitted through the dichroic mirror DM1 is incident on a dichroic mirror DM2. The dichroic mirror DM2 has a spectral transmittance shown in FIG. 2(b), in which a light component in a wavelength range for green is reflected and a light component in a wavelength range for red is transmitted.

The light component in the wavelength range for blue reflected by the dichroic mirror DM1 is turned by a reflecting mirror M2 serving as a light guide reflecting member, passes through a field lens 7B, and then is incident on an image display device 8B, where the light is modulated in accordance with a signal input to the image display device 8B.

The light component in the wavelength range for green reflected by the dichroic mirror DM2 passes through a field lens 7G and is incident on an image display device 8G, where the light is modulated in accordance with a signal input to the image display device 8G.

The light component in the wavelength range for red transmitted through the dichroic mirror DM2 passes through a relay system composed of a trimming filter TR having a spectral transmittance shown in FIG. 2(c), a concave mirror M3, a reflecting mirror M4 and a concave mirror M5, and is incident on an image display device 8R, where the light is modulated in accordance with an input signal. The reflecting mirror M4 may be any of a concave mirror, a convex mirror and a plane mirror.

Each of the image display devices 8R, 8G and 8B is formed of a liquid crystal display panel or the like. A driving circuit, not shown, inputs driving signals to the image display devices 8R, 8G, and 8B in accordance with image information input from an image information supply apparatus IS such as a personal computer, a DVD player, a television and a VTR. This is the same or the following embodiment. The input driving signal drives each of the image display devices 8R, 8G and 8B to form an image for each color in accordance with the image information.

The image light component for each color, modulated by the respective image display devices 8R, 8B and 8G, is incident on a color combination prism 9. The color combination prism 9 is formed of integrally combined four prisms such as dichroic films DM3, DM4 are formed between respective two paired prisms.

The image light component in the blue wavelength range incident on the color combination prism 9 is reflected by the dichroic film DM3 within the color combination prism 9 and thus turned 90 degrees, and then emanates toward a projection lens 10.

The image light component in the green wavelength range incident on the color combination prism 9 is transmitted through the color combination prism 9 as it is and emanates toward the projection lens 10.

The image light component in the red wavelength range incident on the color combination prism 9 is totally reflected by one surface of the color combination prism 9, further reflected by the dichroic film DM4, and emanates toward the projection lens 10.

The optical axis of the emanating image light component for each color is substantially consistent with each other. In this manner, the image light components for red, green and blue are combined and the combined light is projected and displayed by the projection lens 10 on a screen, not shown.

In the present embodiment, the dichroic mirror DM1 is responsible for separating the optical path of the light component of the wavelength for blue from the optical paths of the light components of the wavelength for the other colors. And the dichroic mirror DM2 is disposed immediately before the image display device 8G and is responsible for separating the optical path of the light component of the wavelength for green from the optical path of the light component of the wavelength for red and for bending the optical path of the light component of the wavelength for green. The embodiment is configured such that the optical axis of the light incident on the dichroic mirrors DM1, DM2 forms an angles θ1, θ2 with the normals to the incident surfaces of the dichroic mirrors DM1, DM2, respectively. In the embodiment, the angle θ2 is 42.5 degrees (<45 degrees) and the angle θ1 is smaller than the angle θ2.

More specifically, a condensing optical system of the present embodiment has the reflecting mirror M1 for turning the optical axis of the illumination light from the illumination light source 1 approximately 90 degrees, and the condenser lens 6 for exerting the converging effect on the light reflected by this reflecting mirror M1 to cause the converging light to be incident on the dichroic mirrors DM1, DM2. The condensing optical system is arranged such that the optical axis of the illumination light from the illumination light source 1 to the reflecting mirror M1 is inclined toward the optical axis Lp (optical axis of the projection lens 10) for projection of the image light with respect to the optical axis Lp for projection.

Figure 6:
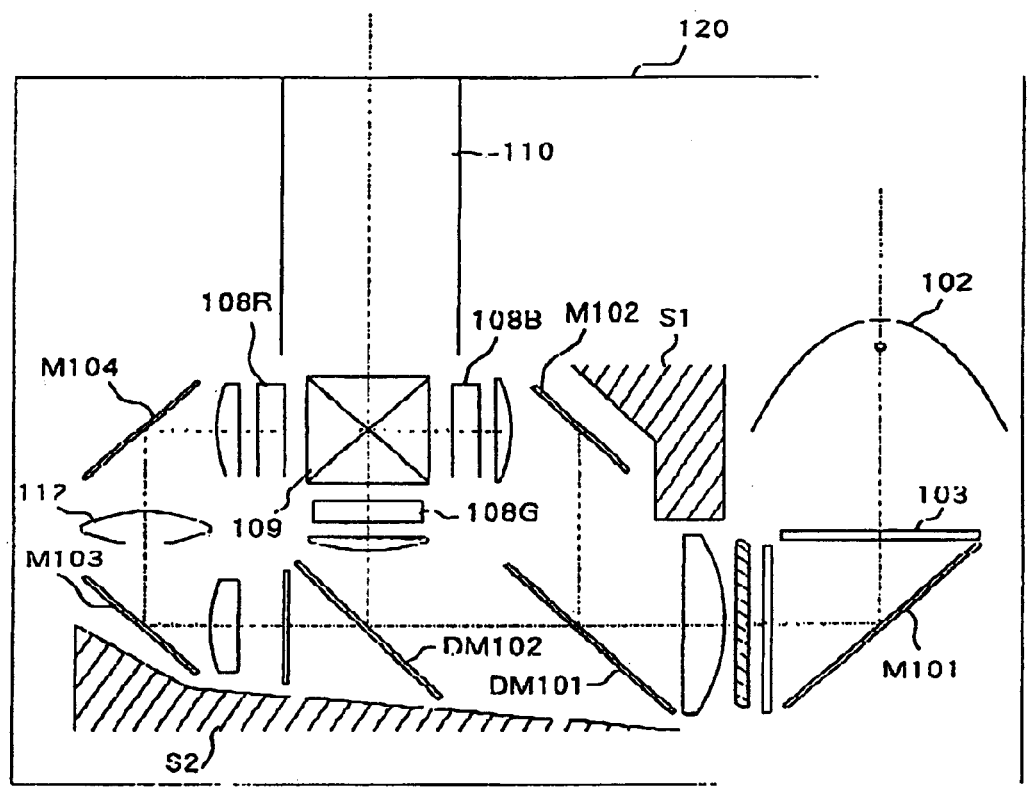
FIG. 6 shows unused spaces in the conventional image display apparatus.

With this arrangement, the illumination light source 1 and the reflector 2 are disposed closer to the reflecting mirror M2 to reduce the hatched space S1 shown in FIG. 6.

In addition, a portion L, which is farthest from the projection lens 10, of the outer periphery of the illumination light (converging light) emanating from the condenser lens 6 extends substantially horizontally in FIG. 1 from near the outer periphery of the condenser lens 6 (in a direction substantially perpendicular to the optical axis for projection).

In other words, according to the present embodiment, a wall surface (a lower wall surface in FIG. 1) 20a closest to the condenser lens 6 and the dichroic mirrors DM1, DM2 of upper and lower wall surfaces in FIG. 1 substantially perpendicular to the optical axis direction of the projection lens 10 in an outer box 20 can extend along the portion L, which is farthest from the projection lens 10, of the outer periphery of the converging light incident on the dichroic mirrors DM1, DM2 from the condenser lens 6 such that the wall surface 20a is arranged near and substantially in parallel with the portion L. In brief, the wall surface 20a is substantially in parallel with and close to the aforementioned portion L of the outer periphery of the converge light.

With the configuration as described above, it is possible to substantially eliminate the hatched space S2 shown in FIG. 6 formed between the outer box 20 and the outer portion L of the illumination light when the display apparatus is housed in the outer box 20 which is typically formed in a generally rectangular parallelepiped.

Therefore, according to the present embodiment, the conventionally wasted spaces S1, S2 can be reduced or eliminated to allow the outer box 20 and the whole apparatus to be compact in size.

It should be noted that, with the setting of the 42.5-degree angle which the optical axis of the light incident on the dichroic mirror DM2 forms with the normal to the incident surface of the dichroic mirror DM2, a 42.5-degree angle is also set for the angle which the optical axis of the light incident on the reflecting mirror M2 arranged symmetrically to the dichroic mirror DM2 forms with the normal to the reflecting surface of the reflecting mirror M2.

In the present embodiment, the optical path length of the illumination light component in red wavelength range is larger than the other optical path lengths, and the relay system including at least two concave mirrors M3, M5 is disposed in the optical path for red. The setting of the angle between the optical axis of the incident light on the dichroic mirror DM2 and the normal to the dichroic mirror DM2 to be lower than 45 degrees as described above reduces the angle of incidence (the angle which the optical axis of the light incident on the concave mirror M3 forms with the normal to the reflecting surface of the concave mirror M3 passing through the intersection of the optical axis and the reflecting surface) θ of the illumination light component in the red wavelength range on the concave mirror M3. Thus, aberration is unlikely to occur on the concave mirror M3 to achieve a reduction in loss of light quantity or a display image of high quality.

If the angle between the optical axis of the light incident on the dichroic mirror DM2 and the normal to the dichroic mirror DM2 is 45 degrees or more, the large spaces S1, S2 with little usefulness are created as shown in FIG. 6, and the angle of the light incident on the concave mirror M3 is increased to cause aberration on the concave mirror M3, resulting in an increase in loss of light quantity.

In the present embodiment, the angle of incidence θ on the concave mirror M3 may be smaller than the angle which the optical axis of the light incident on the dichroic mirror DM2 forms with the normal to the dichroic mirror DM2.

While the present embodiment has been described for the setting of the 42.5 degrees as the angle which the optical axis of the light incident on the dichroic mirror DM2 forms with the normal to the incident surface of the dichroic mirror DM2, the present invention is not limited to this angle as long as it is smaller than 45 degrees.

Similar effects to those in the present embodiment can be achieved by setting the angles θ1, θ2 which the optical axis of the light incident on dichroic mirrors DM1, DM2 forms with the normals to the incident surfaces of the dichroic mirrors DM1, DM2 to be 30 degrees or larger and smaller than 45 degrees, more preferably 35 degrees or larger and 44 degrees or smaller.

In addition, while the present embodiment has been described for the provision of the relay system in the optical path of the light component in the wavelength range for red, the relay system may be provided in the optical path of a light component in one of the other wavelength ranges.

The present embodiment has been described for the relay system including at least two concave mirrors M3, M5 disposed in the optical path with a length larger than the other optical path lengths. The relay system, however, may be composed of a lens 11, 12, 7R and mirrors M6, M7 as shown in another embodiment in FIG. 3. In this case, wasted space can be reduced to achieve a compact apparatus by setting the angles smaller than 45 degrees as the angles which the optical axis of the light incident on the dichroic mirrors DM1, DM2 forms with the normals to the incident surfaces of the dichroic mirrors DM1, DM2, respectively, similarly to the aforementioned embodiment.

Figure 3:
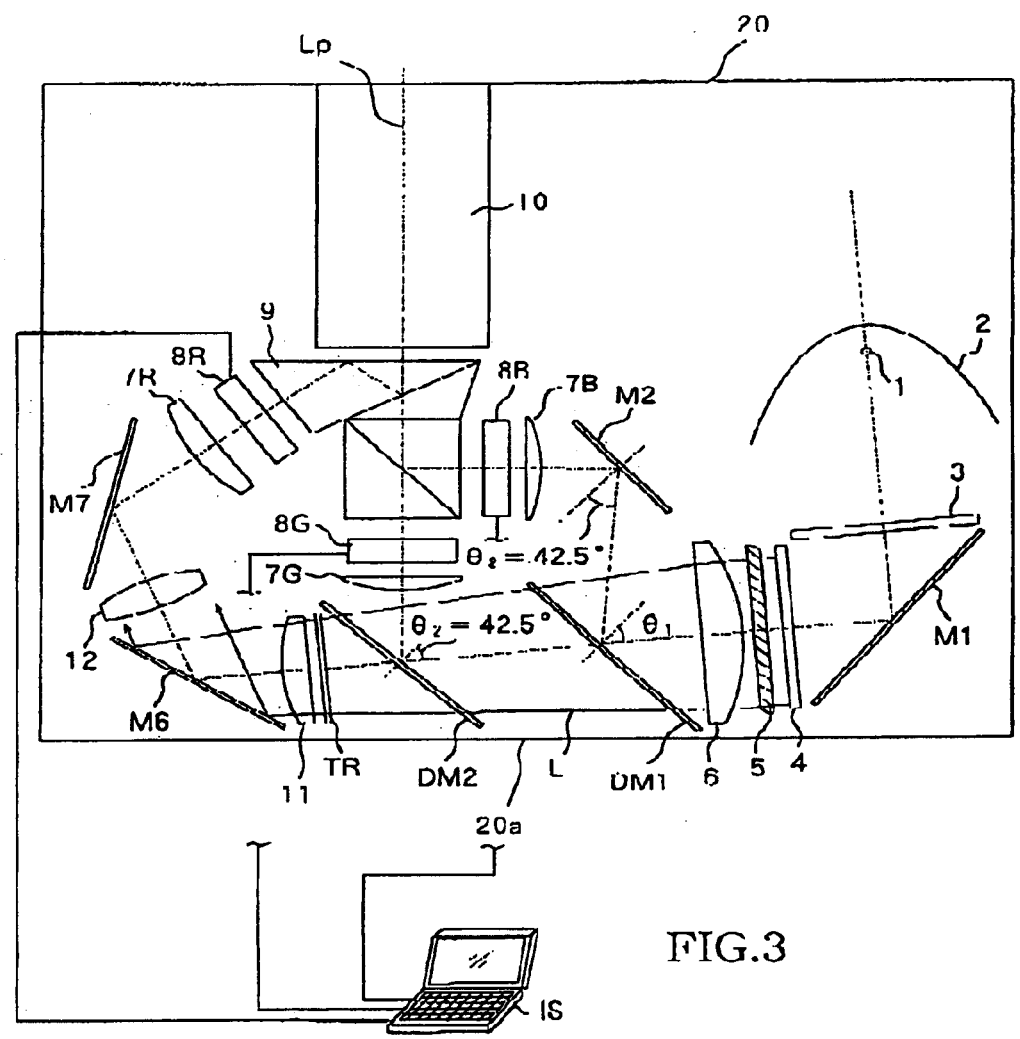
FIG. 3 is a sectional view showing the configuration of a projection type image display apparatus which is another embodiment of the present invention.
Figure 4:
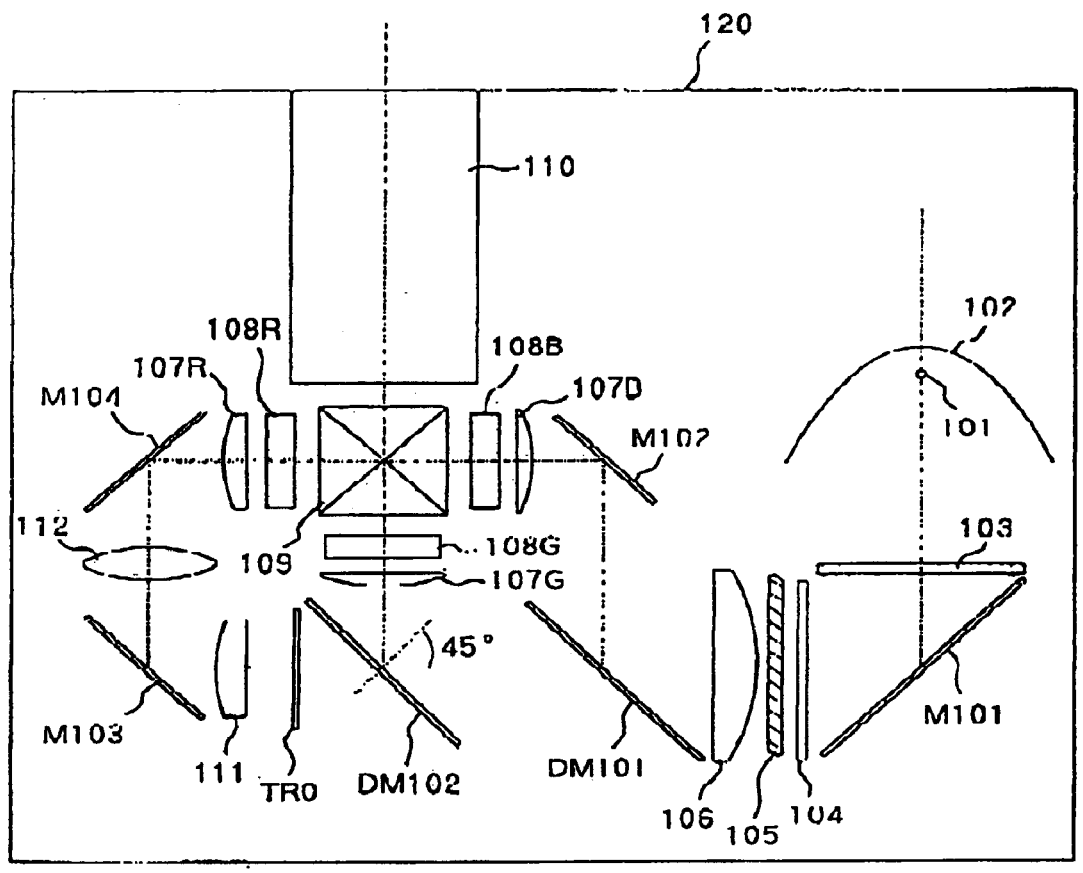
FIG. 4 is a sectional view showing the configuration of a conventional projection type image display apparatus.
Figure 5:
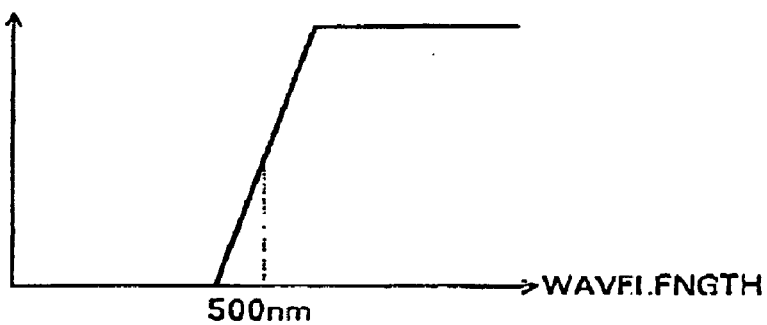
FIGS. 5(a) to 5(c) are schematic graphs illustrating the spectral characteristics of dichroic mirrors and a trimming filter used in the conventional image display apparatus.
Figure 5:
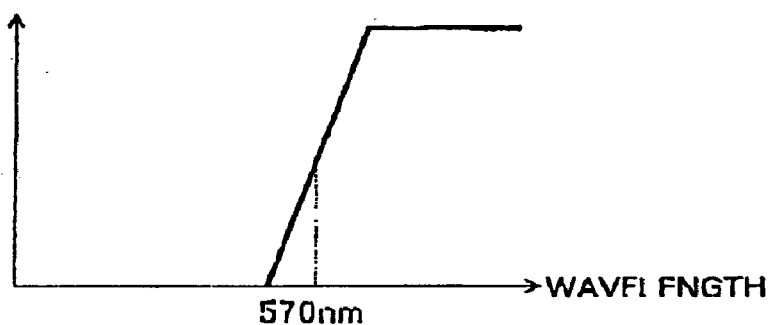
Figure 5:
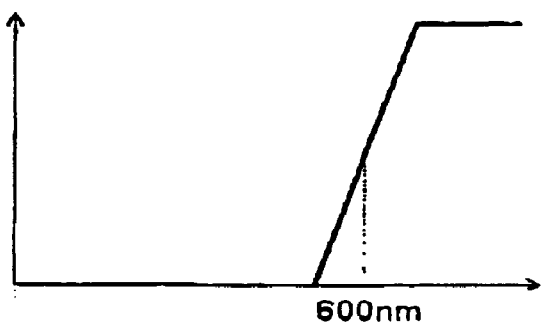

In the embodiment shown in FIG. 3, components common to the present and aforementioned embodiments are designated with the same reference numerals as the aforementioned embodiment.

In the present embodiment, similarly to the aforementioned one, a wall surface (a lower wall surface in FIG. 3) 20a closest to a condenser lens 6 and dichroic mirrors DM1, DM2 of upper and lower wall surfaces in FIG. 3 substantially perpendicular to the optical axis direction of a projection lens 10 in an outer box 20 can extend along a portion L, which is farthest from the projection lens 10, of the outer periphery of the converging light incident on the dichroic mirrors DM1, DM2 from the condenser lens 6 such that the wall surface 20a is arranged near and substantially in parallel with the portion L.

It is thus possible to substantially eliminate the hatched space S2 shown in FIG. 6 formed between the outer box 20 and the outer portion L of the illumination light and allow the outer box 20 and the whole apparatus to be compact in size.

As described above, according to the aforementioned respective embodiments, since the angle which the optical axis of the light incident on the color separation optical member forms with the normal to the light incident surface of the color separation optical member is set to be smaller than 45 degrees, the color separation optical system can be arranged with a higher degree of freedom with respect to the image light combination/projection optical system, as compared with the conventional projection type image display apparatus in which the angle between the optical axis of light incident on the color separation optical member and the normal to the light incident surface of the color separation optical member is set to be 45 degrees.

Thus, for example, when the condensing optical system is configured to have an illumination reflecting member for turning the optical axis of illumination light from a illumination light source 90 degrees and a condensing optical element for exerting a converging effect on the light reflected by the illumination reflecting member and causing the converging light to be incident on the color separation optical member, the condensing optical system can be arranged such that the optical axis of the illumination light from the illumination light source to the illumination reflecting member is inclined toward the optical axis of the projection optical system with respect to the optical axis of the projection optical system.

In addition, according to the present embodiment, the wall surface closest to the condensing optical system and the color separation optical members of the wall surfaces substantially perpendicular to the optical axis direction of the projection optical system in the outer box can extend along the portion, which is farthest from the projection optical system, of the outer periphery of the converging light incident on the color separation optical members from the condensing optical system, and furthermore, the direction of the portion, which is farthest from the projection optical system, of the outer periphery of the converging light incident on the color separation optical members from the condensing optical system can be substantially perpendicular to the optical axis direction of the projection optical system.

Therefore, for example, it is possible to substantially eliminate the conventionally wasted spaces shown as the hatched portions in FIG. 6 to allow the whole apparatus to be compact in size.

In addition, when the relay system including the concave surface reflecting members is disposed in the optical path of the color light component with a length larger than the other optical path lengths of the color light components, the angle between the optical axis of the light incident on the concave surface reflecting member and the normal to the reflecting surface of the concave surface reflecting member passing through the intersection of the optical axis and the reflecting surface is set to be smaller than 45 degrees (and smaller than the angle between the optical axis of the light incident on the color separation optical member and the normal to the light incident surface of the color separation optical member), thereby making it possible to suppress the occurrence of aberration in the relay system, and consequently, loss of light quantity is reduced and good-quality display images can be obtained.

What is claimed is:

1. An image display apparatus comprising:
   a polarization converting element which converts a polarization state of light from a light source;
   a condensing optical system which converts light from the polarization converting element to a converging light;
   a color separation optical system which comprises a color separation optical member reflecting a first light in a first wavelength range of the converging light and transmitting a second light in a second wavelength range of the converging light;
   a plurality of image display devices illuminated by a plurality of color light separated by the color separation optical system; and
   an outer box which contains the polarization converting element, condensing optical system, color separation optical system and plurality of image display devices,
   wherein a first wall surface closest to the color separation optical member among wall surfaces of the outer box is substantially parallel to an outer edge, which closer to the first wall surfaces, of the converging light incident on the color separation optical member.

2. The image display apparatus according to claim 1, wherein an optical axis of the converging light is non-parallel with respect to the first wall surface.

3. The image display apparatus according to claim 1, further comprising two fly-eye lenses arranged between the light source and the polarization converting element.

4. The image display apparatus according to claim 1, further comprising a color combination optical system which combines light components from the plurality of image display apparatus.

5. The image display apparatus according to claim 1, further comprising a projection optical system which projects light from the plurality of image display devices, wherein an optical axis of the projection optical system is substantially parallel to two wall surfaces of the outer box.

6. An image display system comprising:
   the image display apparatus according to claim 1; and
   an image information supply apparatus which supplies image information to the image display apparatus.

7. An image display apparatus comprising:
   a plurality of image display devices;
   a polarization converting element which converts a polarization state of light from a light source;
   a condensing optical system which converts light from the polarization converting element to a converging light and superposes the converging light on the image display devices;
   a color separation optical system which comprises a color separation optical member reflecting a first light in a first wavelength range of the converging light and transmitting a second light in a second wavelength range of the converging light;
   a color combination optical system which combines light components from the image display devices;
   a projection optical system which projects light from the color combination optical system; and
   a reflector which guides a part of light from the light source to the polarization converting element;
   wherein an angle between an optical axis of light from the light source to the reflector and an optical axis of the projection optical system is larger than 0 degrees and is smaller than 45 degrees.

8. An image display system comprising:
   the image display apparatus according to claim 7; and
   an image information supply apparatus which supplies image information to the image display apparatus.

9. An image display apparatus comprising:
   a plurality of image display devices;
   an illumination optical system which illuminates the image display devices by using light from a light source;
   a projection optical system which projects light from the image display devices; and
   a reflector which reflects a part of light from the light source and guides the part of light to the illumination optical system;
   wherein an angle between an optical axis of light from the light source to the reflector and an optical axis of the projection optical system is larger than 0 degrees and is smaller than 45 degrees.

10. An image display system comprising:
    the image display apparatus according to claim 9; and
    an image information supply apparatus which supplies image information to the image display apparatus.

* * * * *

UNITED STATES PATENT AND TRADEMARK OFFICE
CERTIFICATE OF CORRECTION

PATENT NO. : 6,991,337 B2
DATED : January 31, 2006
INVENTOR(S) : Hiroyuki Kodama It is certified that error appears in the above-identified patent and that said Letters Patent is hereby corrected as shown below:

Column 1,
Line 54, delete "TRO" and insert -- TR0 --.

Column 2,
Line 26, delete "INVETION" and insert -- INVENTION --.

Column 3,
Line 53, delete "tothc" and insert -- to the --.

Signed and Sealed this

Eleventh Day of April, 2006

JON W. DUDAS
*Director of the United States Patent and Trademark Office*